(12) United States Patent
Cankaya et al.

(10) Patent No.: US 6,661,789 B1
(45) Date of Patent: Dec. 9, 2003

(54) DYNAMIC BURSTIFICATION BASED ON FULLY/PARTIALLY SHARED MULTICAST ENTITIES

(75) Inventors: Hakki C. Cankaya, Dallas, TX (US); Yijun Xiong, Plano, TX (US); Marc L. J. Vandenhoute, Dallas, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/393,636

(22) Filed: Sep. 10, 1999

(51) Int. Cl.⁷ .............................................. H04L 12/28
(52) U.S. Cl. ...................................................... 370/390
(58) Field of Search ................................ 370/390, 408; 709/249, 227

(56) References Cited

U.S. PATENT DOCUMENTS

| | | | | |
|---|---|---|---|---|
| 4,864,559 A | * | 9/1989 | Perlman ..................... | 370/256 |
| 5,355,371 A | * | 10/1994 | Auerbach et al. ........... | 370/255 |
| 5,418,779 A | * | 5/1995 | Yemini et al. .............. | 370/256 |
| 5,684,961 A | * | 11/1997 | Cidon et al. ................ | 709/243 |
| 5,831,975 A | * | 11/1998 | Chen et al. ................. | 370/256 |
| 5,930,259 A | * | 7/1999 | Katsube et al. ............. | 370/409 |
| 6,192,417 B1 | * | 2/2001 | Block et al. ................ | 709/249 |
| 6,208,647 B1 | * | 3/2001 | Deng et al. ................. | 370/390 |
| 6,353,596 B1 | * | 3/2002 | Grossglauser et al. ...... | 370/256 |
| 6,370,142 B1 | * | 4/2002 | Pitcher et al. .............. | 370/390 |
| 6,374,303 B1 | * | 4/2002 | Armitage et al. ........... | 709/242 |

\* cited by examiner

*Primary Examiner*—Hassan Kizou
*Assistant Examiner*—D L Levitan
(74) *Attorney, Agent, or Firm*—Jessica W. Smith; V. Lawrence Sewell (57) ABSTRACT

A system and method for assembling multiple multicast data packets into a multicast burst according to multiple multicast burstification classes and switching the multicast burst through an optical burst switched network. To switch multicast data packets through an optical burst switched network according to the present invention, multicast data packets are first assembled into a multicast burst at an electronic ingress edge router according to a plurality of multicast burstification classes. The multicast burst is then switched through the optical burst-switched network to the destined electronic egress edge routers, disassembled back into multicast data packets and transmitted to multiple destinations.

34 Claims, 6 Drawing Sheets

DYNAMIC BURSTIFICATION BASED ON FULLY/PARTIALLY SHARED MULTICAST ENTITIES

TECHNICAL FIELD OF THE INVENTION

The present invention relates generally to optical network systems, and more particularly, a system and method for providing dynamic burstification of multicast traffic based on fully/partially shared multicast entities.

BACKGROUND OF THE INVENTION

Data traffic over networks, particularly the internet, has increased dramatically over the past several years, and this trend will continue with increasing number of users and the introduction of new services which require more bandwidth. The enlarged volume of internet traffic requires a network with high capacity routers capable of routing unicast and multicast data packets with variable lengths. A unicast data packet is a data packet generated from an application requiring point-to-point communication. The unicast data packet is switched through a series of electronic packet switching systems to its destination. A multicast data packet is a data packet generated from an application requiring point-to-multipoint or multipoint-to-multipoint communications. The multicast data packet is switched through a tree of electronic packet switching systems to multiple destinations.

Different approaches advocating the use of optical technology in place of electronics in switching systems have been proposed, however current optical networks use only a small fraction of the bandwidth available on a single optical fiber. The emergence of dense-wavelength division multiplexing (DWDM) technology has helped to overcome the bandwidth problems encountered by current optical networks. A single DWDM optical fiber now has the capability of carrying as much as ten (10) terabits of data per second. However, this creates a serious mismatch with current switching technologies which are capable of switching data at rates of only up to a few hundreds gigabits per second.

While emerging ATM switches and IP routers can be used to switch data using the individual channels within a DWDM fiber, typically at 2.4 gigabits per second or 10 gigabits per second, this approach implies that tens or hundreds of switch interfaces must be used to terminate a single link with a large number of channels.

One approach, called optical burst-switched networking, attempts to achieve the best combination of optical and electronic switching technologies. To circumvent potential bottlenecks in electronic processing, the data unit to be transferred in the optical burst-switched network is a data burst. A data burst, or simply a burst, is a collection of one or more data packets which have a set of common attributes. An obvious example would be a common egress point in an optical burst-switched network. The electronics provide dynamic control of system resources by assigning individual user data bursts to channels on a DWDM fiber. Optical technology is used to switch the user data bursts entirely within an optical domain. Optical burst switched networks are able to switch both unicast and multicast data bursts. However, limitations of optical component technology has largely limited optical switching to facility management applications.

Previously developed optical burst-switched networking systems have performed poorly and generally tend to demonstrate the inefficiency of current optical components. For example, one prior art optical burst-switched network utilized ATM switches in the control network which made the design of the control network much more complicated and suboptimal. Other prior art optical burst-switched networks used electronic buffers in the optical routers, thus the optical burst-switched network was not purely optical. The electronic buffers did not provide end-to-end transparent optical paths for data bursts. Thus, little has been done to stimulate any serious move toward optical burst-switching.

SUMMARY OF THE INVENTION

The present invention provides a dynamic burstification system and method based on fully/partially shared multicast trees that substantially eliminates or reduces disadvantages and problems associated with previously developed systems and methods used for switching multicast data packets.

More specifically, the present invention provides a system and method for collecting multiple multicast data packets into a multicast burst according to some multicast burstification classification criteria, then switching the multicast burst through an optical burst switched network. To switch multicast data packets through an optical burst switched network according to the present invention, multicast data packets are first assembled into a multicast burst at an electronic ingress edge router according to a plurality of multicast burstification criteria (classes). The multicast burst is then switched through the optical burst-switched network to the destined electronic egress edge routers where the burst is disassembled back into multicast data packets and transmitted to its final (multiple) destinations.

The present invention provides a technical advantage by providing an optimized way to assemble multiple multicast data packets into a single multicast burst according to multiple multicast burstification classes and transmitting the multicast burst through an optical burst switched network.

The present invention provides a technical advantage by increasing the burst length of multicast traffic, thus providing increased efficiency in the transfer of multicast traffic in optical burst-switched networks.

The present invention provides another technical advantage by reducing the burst assembly time interval resulting in reduced multicast data packet latency at an electronic ingress edge router.

The present invention provides another technical advantage by reducing the amount of control traffic and control operations necessary to forward/route multicast bursts to their destinations.

The present invention provides another technical advantage since it is largely independent of the specifics of the control units of underlying optical burst-switches (e.g. ATM based) or the specifics of the optical switch matrix (e.g. may use electronic or optical buffers).

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
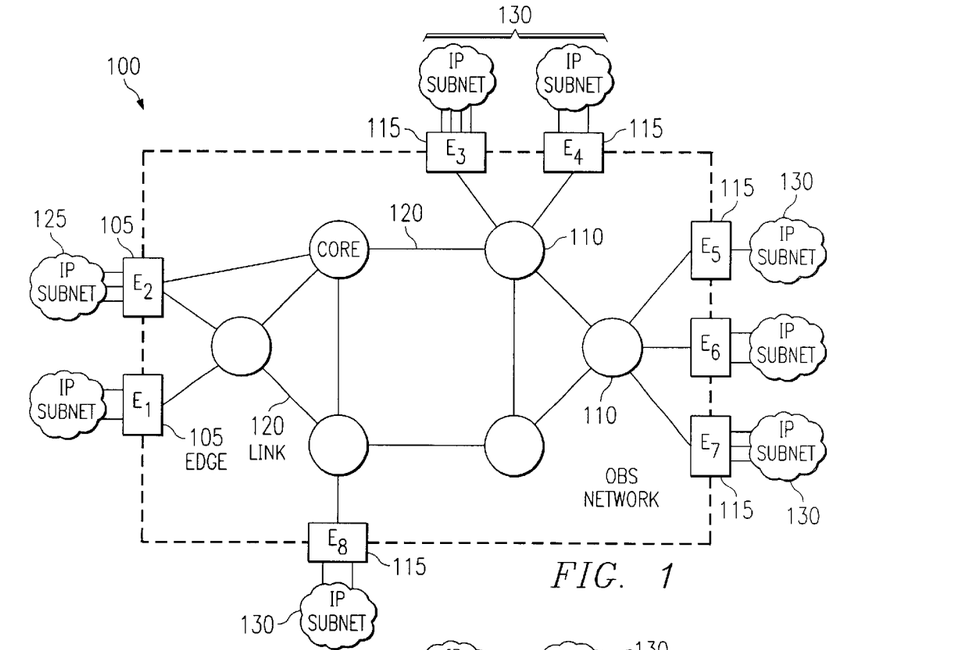
FIG. 1 shows one example of an optical burst-switched (OBS) network.

FIG. 1 shows one example of an optical burst-switched (OBS) network 100 according to the present invention. The optical burst-switched network 100 includes a plurality of electronic ingress edge routers 105, a plurality of optical core routers 110, a plurality of electronic egress edge routers 115, and a plurality of DWDM links 120. A plurality of input subnets 125 and destination subnets 130 shown in FIG. 1 are located outside the optical burst-switched network 100. The optical burst-switched network 100 is able to switch unicast, multicast and broadcast databursts.

Note that, although electronic ingress edge router and electronic egress edge router are logically distinguished in FIG. 1, both functions are often physically combined in one single physical edge router device. Unicast data packets are assembled into bursts according to their destination electronic egress edge router address 115. Multicast data packets are assembled into multicast bursts according to their source address and multicast group address (S, G), or simply by their multicast group address (*, G), depending on the multicast routing protocol used. Broadcast data packets are a special case of multicast data packets where the data packets are broadcast to every address in the optical burst-switched network 100.

Apart from the source address and the multicast group address, multicast bursts are assembled based on two parameters, burst assembly time interval and maximum burst length. Because multicast data packets are usually assembled into multicast bursts within given time intervals (that are constrained by end-to-end delay among others), the average burst length of single group multicast traffic is much smaller than that of unicast traffic, as fewer packets fit the criteria to be assembled together in one burst. For a given multicast burst overhead, this results in very inefficient transfer of multicast traffic in the optical burst-switched network 100. For example, if the multicast burst overhead is 10 Kbits in a 10 Gbps channel, an average multicast burst length of 200 Kbits is required to achieve 95% channel utilization.

In one embodiment of the present invention, increasing the average burst length for multicast traffic is accomplished by increasing the multicast burst assembly time interval. In another embodiment of the present invention, multicast data packets are assembled into bursts, not corresponding to merely one multicast group, but sets of multicast groups. A multicast group is a set of senders and receivers. From the optical burst-switched network 100 point of view, a multicast group consists of an electronic ingress edge router and a set of electronic egress edge routers. A multicast burstification class can be defined according to one of four scenarios. For the sake of simplicity, only two multicast groups in a multicast burstification class are shown to be associated with multicast trees $T_1$ and $T_2$ in describing each of the four scenarios. However, multiple groups within a multicast burstification class could be associated with multiple multicast trees. Although other criteria (e.g. quality of service or security requirements) may determine the burstification classes, these are not taken into account in this description.

In each of the four scenarios, T=(C, E, L) where T represents a multicast tree of a multicast group in the optical burst-switched network 100, C is the set of optical core routers 110, E is the set of member electronic ingress and egress edge routers, 105 and 115 respectively, and L is the set of DWDM links 120 that are occupied by a given multicast tree to deliver the multicast bursts. Furthermore, if there are N multicast burstification classes (MBC) at an electronic ingress edge router and the $j^{th}$ multicast burstification class has $R_j$ multicast trees then:

$$MBC_j=(T_{j1}, T_{j2}, \ldots, T_{jR_j}), \text{ where } j=1,2,\ldots,N$$

and $$T_{jk}=(C_{jk}, E_{jk}, L_{jk}), \text{ where } k=1,2,\ldots,R_j.$$

Figure 2:
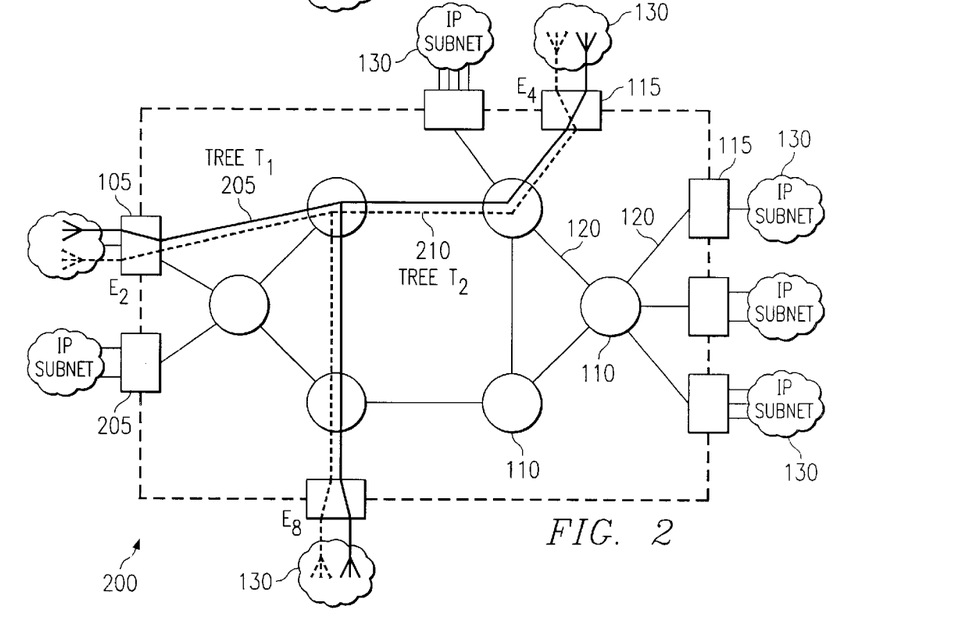
FIG. 2 shows one example of an equi-tree in an optical burst switched network (ETON) according to the present invention.

FIG. 2 shows one example of the first multicast burstification class called an "equi-tree in an optical burst-switched network" (ETON) 200. The equi-tree in an optical burst-switched network or ETON includes one electronic ingress edge router 105, a plurality of optical core routers 110, a plurality of electronic egress edge routers 115, a plurality of DWDM links 120, a first multicast tree $T_1$ 205 and a second multicast tree $T_2$ 210. In this first scenario, multicast trees associated with a multicast burstification class share the same links 120, core routers 110, electronic ingress edge router 105, and electronic egress edge routers 115. Specifically, for $MBC_j$, $T_{j1}=T_{j2}=\ldots=T_{jR_j}$.

In one embodiment of ETON, all of the multicast data packets associated with the first multicast tree $T_1$ 205 would be assembled in a multicast burst at the electronic ingress edge router 105 and switched through the optical burst-switched network 100 to the electronic egress edge routers $E_4$ and $E_8$ 115. Similarly, all of the multicast data packets associated with the second multicast tree $T_2$ 210 would be assembled in a multicast burst at the electronic ingress edge router 105 and switched through the optical burst-switched network 100 to the electronic egress edge routers $E_4$ and $E_8$ 115. Once the two multicast bursts reach their respective electronic egress edge routers they would be disassembled and transmitted to their respective destination subnets 130.

The problem with assembling the multicast data packets into two separate bursts at the same electronic ingress edge router 105 and transmitting the two multicast bursts to the same electronic egress edge routers 115 is that the same overhead is used for each multicast burst. In addition, since each multicast burst must be assembled in a given time interval and the volume of the multicast traffic is not very big, it is unlikely that enough multicast data packets will be assembled in a short interval.

In another embodiment of ETON, if a set of multicast data packets associated with different multicast trees which share the same electronic ingress edge router 105, DWDM links 120, optical core routers 110, and electronic egress edge routers 115, packets can be assembled together into a single multicast burst with one set of overhead. Hence, it is more likely that more multicast data packets can be assembled in the same time interval, thus making multicast data packet switching more efficient. In FIG. 2 note that the first multicast tree $T_1$ 205 and the second multicast tree $T_2$ 210 both share the same DWDM links 120, optical core routers 110, electronic ingress edge router 105, and electronic egress edge routers 115 thus creating an equi-tree. Therefore, all of the multicast data packets associated with the first and second multicast trees, $T_1$ 205 and $T_2$ 210, can be grouped in a multicast burstification class. The multicast packets can then be assembled into a single multicast burst with one set of overhead at the electronic ingress edge router 105 and switched through the optical burst-switched network 100 on either the first multicast tree $T_1$ 205 or the second multicast tree $T_2$ 210. The single multicast burst can then be disassembled back into the multicast data packets at the electronic egress edge routers $E_4$ and $E_8$ 115 and transmitted to the output subnets 130.

Figure 3:
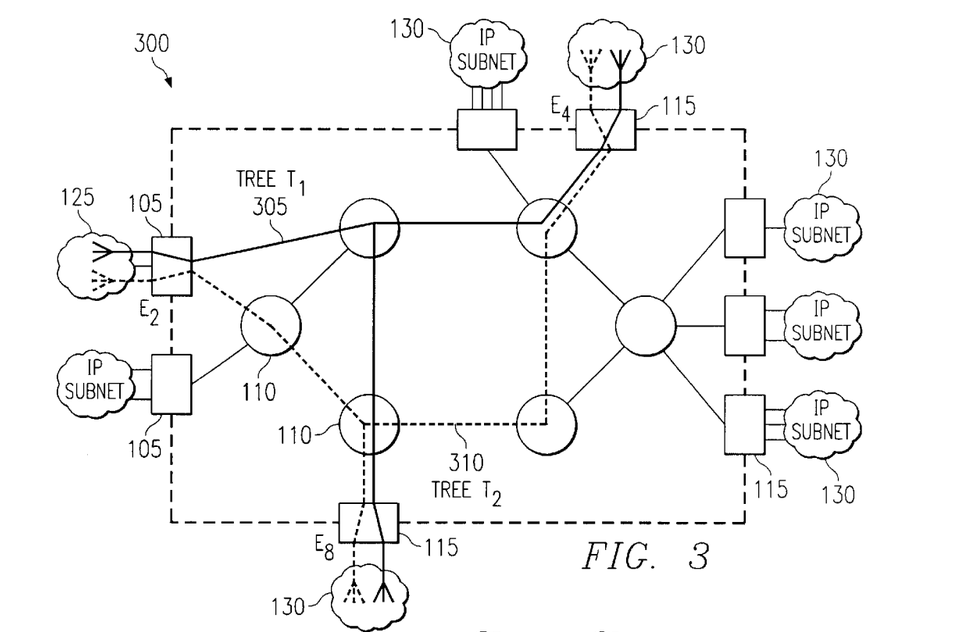
FIG. 3 shows one example of equi-coverage in an optical burst-switched network (ECON) according to the present invention.

FIG. 3 shows one example of the second multicast burstification class called equi-coverage in an optical burst-switched network (ECON) 300. The ECON includes one electronic ingress edge router 105, a plurality of optical core routers 110, a plurality of electronic egress edge routers 115, a plurality of DWDM links 120, a first multicast tree T, 305, and a second multicast tree $T_2$ 310. In this second scenario, the multicast trees associated with a multicast burstification classes share the same electronic ingress edge routers 105 and electronic egress edge routers 115, but do not necessarily share the same DWDM links 120, or optical core routers 110. Specifically, $MBC_j$, $E_{j1}=E_{j2}=\ldots=E_{jRJ}$ in the ECON case.

In one embodiment of ECON, all of the multicast data packets associated with the first multicast tree $T_1$ 305 would be assembled in a multicast burst at the electronic ingress edge router 105 and switched through the optical burst switched network 100 to the electronic egress edge routers $E_4$ and $E_8$ 115. Similarly, all of the multicast data packets associated with the second multicast tree $T_2$ 310 would be assembled in a multicast burst at the electronic ingress edge router 105 and switched through the optical burst-switched network to the electronic egress edge routers $E_4$ and $E_8$ 115. Once the two multicast bursts reached their respective electronic egress edge routers 115 they would be disassembled and transmitted to their respective destination subnets 130.

Again, the problem with assembling the multicast data packets into two separate bursts at the same electronic ingress edge router 105 and transmitting the two multicast bursts to the same electronic egress edge routers 115 is that the same overhead is used for each multicast burst. Since each multicast burst must be assembled in a given time interval and the volume of the multicast traffic can be relatively light so that relatively few multicast data packets will be assembled during short time intervals.

In another embodiment of ECON, if a set of multicast data packets that are associated with different multicast trees and share the same electronic ingress edge router 105 and electronic egress edge routers 115 can be assembled together into a single multicast burst with one set of overhead, it is more likely that more multicast data packets can be assembled in the same time interval, thus making multicast data packet switching more efficient. In FIG. 3 note that the first multicast tree $T_1$ 305 and the second multicast tree $T_2$ 310 both share the same electronic ingress edge router 105 and electronic egress edge routers 115, thus creating an equi-coverage multicast tree. Therefore, all of the multicast data packets associated with the first and second multicast trees, $T_1$ 305 and $T_2$ 310, can be grouped in a multicast burstification class. The multicast data packets can then be assembled into a single multicast burst with one set of overhead at the electronic ingress edge router 105 and switched through the optical burst-switched network 100 on either the first multicast tree $T_1$ 305 or the second multicast tree $T_2$ 310. The single multicast burst can then be disassembled back into the multicast data packets at the electronic egress edge routers $E_4$ and $E_8$ 115 and transmitted to the output subnets 130.

In ECON, load balancing can be used to determine which multicast tree to send the single multicast burst on. For example, one load balancing technique may be to alternate the multicast trees $T_1$ 305 and $T_2$ 310 evenly for sending multicast bursts. In another example, the total multicast traffic may be unevenly distributed in an alternating nature among multicast trees. Other load balancing techniques known to those skilled in the art may also be used. The load balancing decisions occur in the electronic ingress edge router 105.

Figure 4:
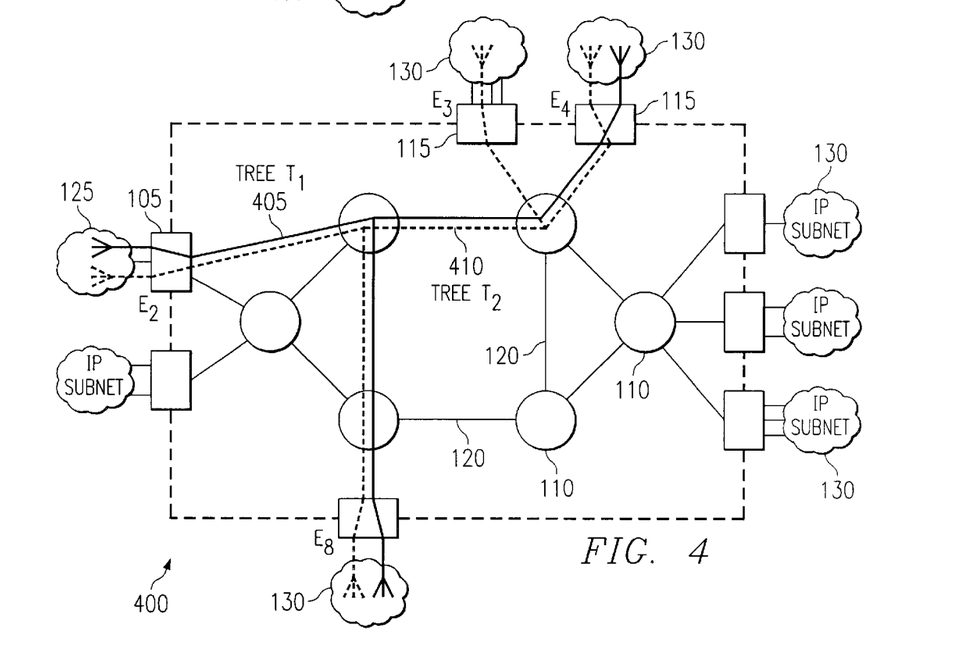
FIG. 4 shows one example of super-coverage in an optical burst-switched network (SCON) according to the present invention.

FIG. 4 shows an example of the third multicast burstification class called super-coverage in an optical burst-switched network (SCON) 400. The SCON 400 or FIG. 4 includes one electronic ingress edge router 105, a plurality of optical core routers 110, a plurality of electronic egress edge routers 115, a plurality of DWDM links 120, a first multicast tree $T_1$ 405, and a second multicast tree $T_2$ 410. In this scenario, the multicast trees associated with a multicast burstification class may not share the same electronic egress edge routers 115, DWDM links 120, or optical core routers 110, however, at least one of the multicast trees (called a super tree) covers the ingress edge router 105 and all the electronic egress edge routers 115 shared by all the multicast trees combined. The difference in the number of electronic egress edge routers 115, DWDM links 120, or optical core routers 110 between the super tree and each multicast trees should not be larger than some predetermined threshold value.

In one embodiment of SCON, all of the multicast data packets associated with the first multicast tree $T_1$ 405 would be assembled in a multicast burst at the electronic ingress edge router 105 and switched through the optical burst switched network 100 to the electronic egress edge routers $E_4$ and $E_8$ 115. Similarly, all of the multicast data packets associated with the second multicast tree $T_2$ 410 would be assembled in a multicast burst at the electronic ingress edge router 105 and switched through the optical burst-switched network 100 to the electronic egress edge routers $E_3$, $E_4$, and $E_8$ 115. Finally the multicast bursts switched on the multicast tree $T_1$ 405 would be disassembled at the electronic egress edge routers $E_4$ and $E_8$ 115 and transmitted to their respective subnets 130. Similarly, the multicast bursts switched on the multicast tree $T_2$ 410 would be disassembled at the electronic egress edge routers $E_3$, $E_4$ and $E_8$ 115 and transmitted to their respective destination subnets 130.

Again, the problem with assembling the multicast data packets into two separate bursts at the same electronic ingress edge router 105 and transmitting the two multicast bursts to at least some of the same electronic egress edge routers 115 is that the same overhead is used for some of the multicast bursts. Since each multicast burst must be assembled in a given time interval and the volume of the multicast traffic is relatively small, it is unlikely that enough multicast data packets will be assembled in short time intervals. In another embodiment of SCON, where there is at least one multicast tree (called a super tree) which covers the electronic ingress edge router 105 and all the electronic egress edge routers 115 covered by all of the multicast trees combined, the multicast packets can be assembled into a single multicast burst with one set of overhead and transmitted on the super tree to all of the electronic egress edge routers 115. Therefore, it is more likely that more multicast data packets can be assembled in the same time interval, thus making multicast data packet switching more efficient.

In FIG. 4, note that the first multicast tree $T_1$ 405 and the second multicast tree $T_2$ 410 do not share the same electronic egress edge routers 115. However, multicast tree $T_2$ 410 covers all the electronic egress edge routers 115 covered by the first and second multicast trees combined ($T_1$ 405 and $T_2$ 410) thus creating a super-coverage multicast tree. Therefore, all of the multicast data packets associated with the first and second multicast trees ($T_1$ 405 and $T_2$ 410) can be assembled into a single multicast burst with one set of overhead at the electronic ingress edge router 105 and switched through the optical burst-switched network 100 on the super tree. In FIG. 4, the super tree is the second multicast tree $T_2$ 410. The multicast burst can then be disassembled back into multicast data packets at the electronic egress edge routers $E_3$, $E_4$ and $E_8$ 115 and transmitted to the respective output subnets 130. Note also that the multicast data packets associated with multicast tree $T_1$ 405 are discarded at electronic egress edge router $E_3$ 115.

In SCON scenario, some criteria are required in constructing a SCON multicast burstification class. These criteria expect to ensure the overall delivery efficiency of multicast data packets in the optical burst switched network when using shared multicast entities concept. In one embodiment, a maximum threshold limit can be set on the difference in the number of DWDM links 120, optical core routers 110, and the electronic egress edge routers 115 that are allowed between the super tree and the other multicast trees in the MBC. A network administrator can set these maximum threshold limits. The electronic ingress edge router 105 compares the super tree to each individual multicast tree to make sure these maximum threshold limits are not violated. The following three inequalities can be used to establish a multicast burstification class with various threshold values for the DWDM links 120, the optical core routers 110, and the ingress and egress edge routers 105 and 115:

$$E_{jk} \subseteq E_j^s \text{ for all } k = 1, 2, \ldots, R_j$$

$$\left| E_j^s - \bigcap_i^{R_j} E_{ji} \right| \leq h^E \tag{1}$$

$$\left| C_j^s - \bigcup_i^{R_j} C_{ji} \right| + \left| \bigcup_i^{R_j} C_{ji} - C_j^s \right| \leq h^C, \tag{2}$$

$$\left| L_j^s - \bigcup_i^{R_j} L_{ji} \right| + \left| \bigcup_i^{R_j} L_{ji} - L_j^s \right| \leq h^L. \tag{3}$$

Where $h^C$, $h^E$ and $h^L$ are the thresholds for the optical core routers C, electronic ingress and egress edge routers E and DWDM links L, respectively. Note that $|Y|$ is the cardinality of set Y.

Equation one (1) defines the SCON classification and controls the trade-off between burstification efficiency and processing overhead on some edge routers. Equations two (2) and three (3) are related to the average performance of multicast burst delivery. Equations two (2) and three (3) control the tradeoff between system level burstification and overall multicast traffic efficiency.

In another embodiment, the Classification Efficiency Ratio, denoted by CER, is used, which gives the ratio of the accumulated cost of delivering multicast traffic of the individual multicast sessions via their multicast trees to the total cost of delivering multicast traffic of the MBC via the super tree. Again, let us assume there are N multicast burstification classes (MBC) at an electronic ingress edge router and the $j^{th}$ multicast burstification class, $MBC_j$, has $R_j$ multicast trees. The multicast traffic volume of the $k^{th}$ multicast group in the same $MBC_j$ is $D_{jk}$, where $k=1,2,\ldots,R_j$, and the cost of delivering a unit traffic volume on tree $T_{jk}$ is $S_{jk}$. Further, the cost of delivering a unit traffic volume on super tree $T_j^S$ is $S_j^S$. The following inequality can be used to establish SCON class $MBC_j$ for an electronic ingress edge router.

$$CER_j = \frac{\sum_{k=1}^{R_j} D_{jk} S_{jk}}{S_j^S \sum_{k=1}^{R_j} D_{jk}} \geq h^R \tag{4}$$

Figure 5:
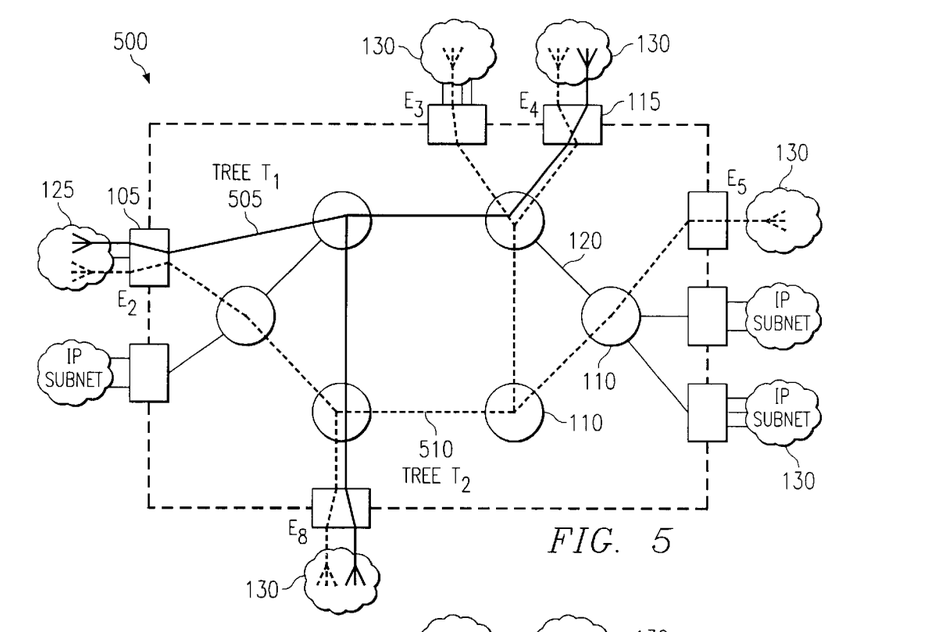
FIG. 5 shows another example of super-coverage in an optical burst-switched network according to the present invention.

The $h^R (\geq 1)$ is a predefined value. For inequality (4), in one embodiment, $S_{jk}$ the sum of DWDM links in tree $T_{jk}$, and $S_j^S$ is the sum of DWDM links in the super tree. In another embodiment, $S_{jk}$ and $S_j^S$ are the weighted sum of DWDM links in tree $T_{jk}$ and the super tree $T_j^S$, respectively. DWDM link length can for example be used as the weight in calculating the cost. FIG. 5 shows another example of super-coverage in an optical burst-switched network (SCON) 500 according to the present invention. In FIG. 5, the multicast tree $T_2$ 510 is the super tree since it shares the same electronic ingress and egress edge routers as all of the multicast trees combined. Note that the example in FIG. 5 has more overhead than the example shown in FIG. 4. Also note that for ETON, $h^C = h^E = h^L = 0$ and for ECON, $h^E = 0$.

Figure 6:
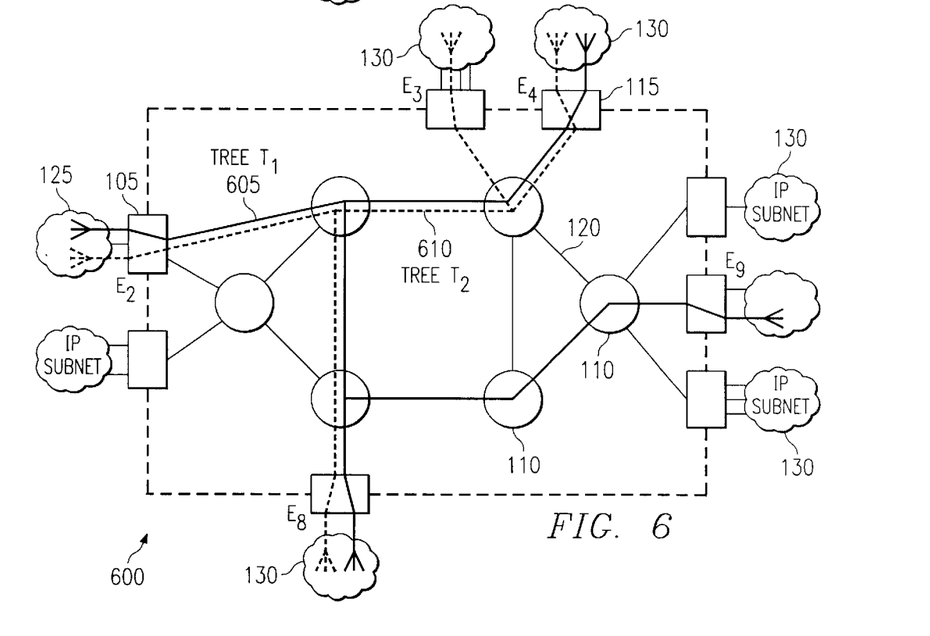
FIG. 6 shows one example of overlapping-coverage in an optical burst-switched network (OCON) according to the present invention.

FIG. 6 shows one example of overlapping-coverage in an optical burst-switched network (OCON) 600 according to the present invention. The OCON 600 is an extension of SCON 500. In OCON 600, the multicast trees of a multicast burstification class may not share all the egress edge routers 115, however, a union tree which covers all of the egress edge routers 115 can be created to deliver the assembled multicast burst. As with SCON 500, the difference between the union tree and multicast trees in terms of the numbers of egress edge routers 115, DWDM links 120, and optical core routers 110 should not be larger than some predetermined threshold value. Equations (1), (2), (3), and (4) used under SCON 500 hold for OCON 600, as well.

In one embodiment of OCON 600, all of the multicast data packets associated with the first multicast tree $T_1$ 605 could be assembled in a multicast burst at the electronic ingress edge router 105 and switched through the optical burst switched network 100 to the electronic egress edge routers $E_4$, $E_8$ and $E_9$. Similarly, all of the multicast data packets associated with the second multicast tree $T_2$ 610 could be assembled in a multicast burst at the electronic ingress edge router 105 and switched through the optical burst switched network to the electronic egress edge routers $E_3$, $E_4$ and $E_8$. Finally the multicast bursts switched on the multicast tree $T_1$ 605 would then be disassembled at the electronic egress edge routers $E_4$, $E_8$ and $E_9$ and transmitted to their respective subnets 130. Similarly, the multicast bursts switched on the multicast tree $T_2$ 610 would be disassembled at the electronic egress edge routers $E_3$, $E_4$ and $E_8$ and transmitted to their respective destination subnets 130.

Again, the problem with assembling the multicast data packets into two separate bursts at the same electronic ingress edge router 105 and transmitting the two multicast bursts to some of the same electronic egress edge routers 115 is that the same overhead is used for some of the multicast bursts. Since each multicast burst must be assembled in a given time interval and the traffic volume of a single multicast group is not very big, it is unlikely that enough multicast data packets can be assembled in a short interval. In another embodiment of OCON 600, where none of the multicast trees of a multicast burstification class cover all the ingress and egress edge routers, 105 and 115 respectively, a union tree which covers all of the ingress and egress edge routers, 105 and 115 respectively, can be created to deliver multicast bursts to all of the egress edge routers 105 and 115. Therefore, a single multicast burst with one set of overhead can be assembled and transmitted on the union tree. Thus, it is more likely that more multicast data packets can be assembled in the same time interval, thus making multicast data packet switching more efficient.

In FIG. 6 note that the first multicast tree $T_1$ 605 and the second multicast tree $T_2$ 610 do not share the same electronic egress edge routers 115, however, the combination of multicast trees $T_1$ 605 and $T_2$ 610 covers all the electronic egress edge routers 115, thus creating an overlapping-coverage multicast tree. Therefore, all of the multicast data packets from the first and second multicast tree can be assembled into a single multicast burst with one set of overhead at the electronic ingress edge router 105 and switched through the optical burst-switched network 100 on the newly formed overlapping-coverage multicast tree. The multicast burst can then be disassembled back into the multicast data packets at the electronic egress edge routers $E_3$, $E_4$ and $E_8$, and $E_9$ 115 and transmitted to the respective output subnets 130. The trade off with OCON in FIG. 6 is that the electronic egress edge routers E3 and E9 115 will need to discard some of the multicast data packets they receive.

Figure 7:
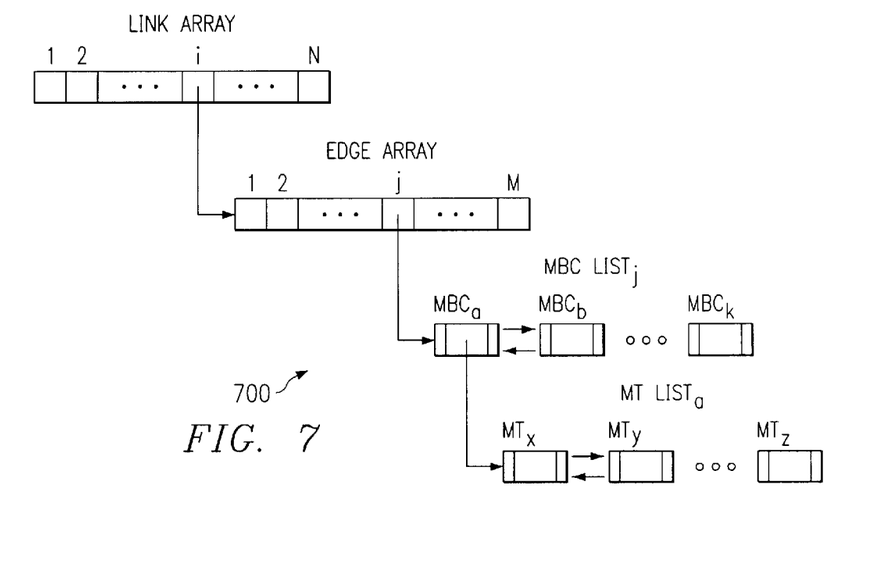
FIG. 7 depicts a method for searching for multicast burstification classes in terms of a set of electronic egress edge routers.
Figure 8:
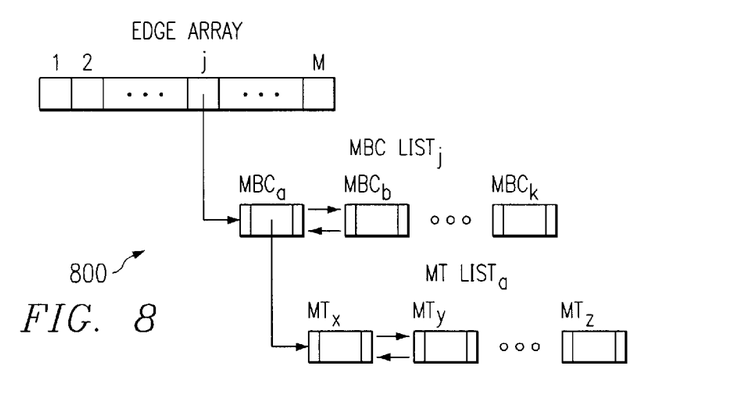
FIG. 8 is a diagram showing two trees that are to be merged using the Breadth-First-Merge algorithm.

For an efficient implementation of multicast burstification class (MBC) search, we propose data structures for ETON, ECON, SCON, and OCON cases. FIG. 7 depicts the data structure 700 for the ETON case where the LinkArray is an array of pointers to the corresponding EdgeArray for the MBCs having the same number of links in their trees. This number is represented by the index of the array. For example, LinkArray[i] contains a pointer relating all the MBCs having i number of links in their trees. This pointer points to another array of pointers which point to actual MBCs having the same number of edge routers in their trees. For example, EdgeArray$_i$[j], likewise, points to a linked list of MBCs which have i number of links and j number of edge routers in their trees. Each MBC has a list of multicast trees (MTs) that belong to the MBC. The data structure 800 for the ECON, SCON, and OCON cases, given in FIG. 8, contains only one EdgeArray pointing to the lists of MBCs having the same number of edge routers in their representative trees regardless of the set of links.

Figure 9:
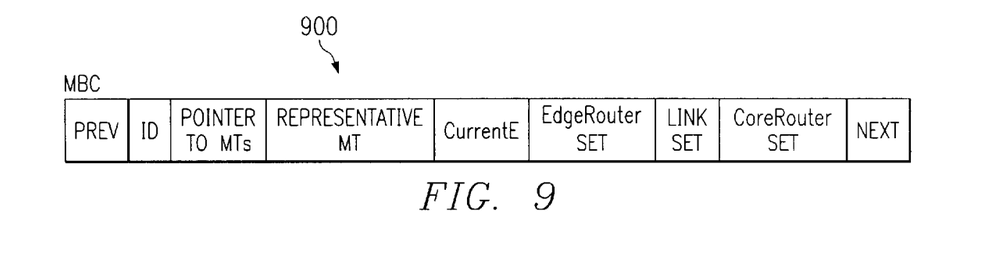
FIG. 9 is a diagram showing the result after the Breadth-First-Merge algorithm was run to merge the two trees in FIG. 8.

FIG. 9 depicts the data structure 900 of the MBC for all cases. The structure has a pointer to a linked list of all the MTs ("pointer to MTs" in FIG. 9) that belong to this MBC. It maintains an information for the representative tree ("Representative MT" in FIG. 9) of the MBC by a pointer to a MT. It also maintains current difference ("CurrentE" in FIG. 9) between the representative tree and the smallest tree in edge, link, and core counts, respectively. It has pointers to shared edge routers ("EdgeRouter Set" in FIG. 9), links ("Link Set" in FIG. 9), and core routers ("CoreRouter Set" in FIG. 9), respectively. Furthermore, it has two pointers, "prev" and "next" in FIG. 9, to link the structure to a doubly linked list.

Figure 10:
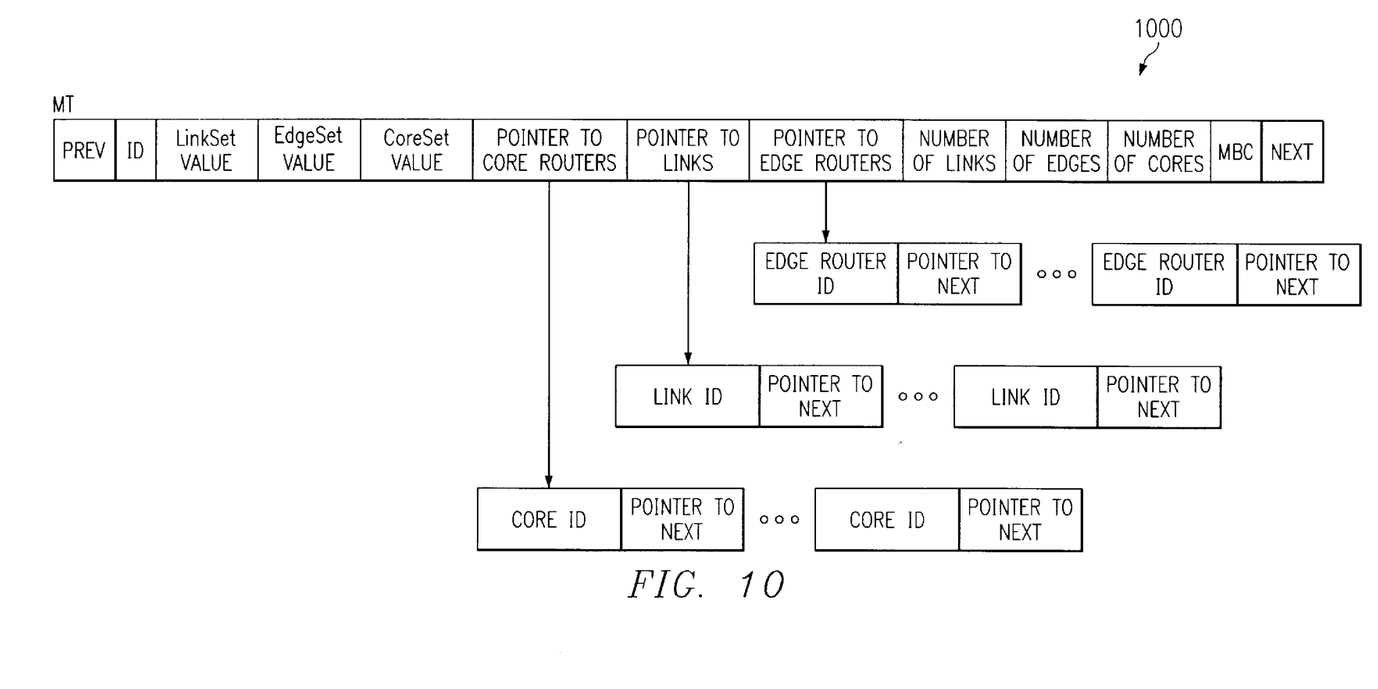
FIG. 10 shows a data structure for an ETON implementation.

FIG. 10, shows the data structure 1000 of the MT for all cases. The data structure 1000 has pointers to lists of edge routers, core routers, and links that it utilizes. These lists are in order (e.g. ascending order of IDs). The structure keeps track of the numbers of edge routers, core routers and links. This information is used for direct access in the search process for addition and deletion of a MT. Every MT has LinkSet, EdgeSet, and CoreSet values. The purpose of using LinkSet, EdgeSet and CoreSet values is to further narrow down the search for a MT. Note that some of the content in in the generic data structure for any MT could be empty.

The purpose of using LinkSet, EdgeSet and CoreSet values are to further narrow down the search for a MT. Following are two implementations: (1) all the functions are injection where if $a \neq b$ implies $f(a) \neq f(b)$ and (2) at least one is non-injection. Using injection functions can greatly simplify the MT search as it provides a unique relationship between a set and its set value. Obtaining an injection function constitutes another problem. Note that some of the content in in the generic data structure for any MT could be empty if the related information is not available in some scenarios.

Management of the four burstification classes is another task. Management of the four burstification classes includes two basic operations: addition and deletion of a multicast group to and from a multicast burstification class. The electronic ingress edge routers 105 run a separate algorithm for the addition and deletion of multicast groups to and from a multicast burstification class. A high level generic description for the two algorithms are shown below. In each of the two high level generic algorithms, X=ETON, ECON, SCON, or OCON. The multicast tree subject to each of the algorithms is T*.

```
1. Addition:
    algorithm X_addition(T*)
      Search for the X MBC;
      if there exists MBC_j which satisfies the X definition;
        MBC_j ← MBC_j ∪ T*;
      else
        MBC_k ← create a new MBC;
        MBC_k ← T*;
    end_algorithm
2. Deletion:
    algorithm X_deletion(T*)
      find MBC_j which contains T*;
      MBC_j ← MBC_j - T*;
      if MBC_j = ∅ then terminate MBC_j;
    end_algorithm
```

A more detailed description of particular embodiments of the algorithms for the addition of a multicast tree into a multicast burstification class and the deletion of a multicast tree from a multicast burstification class are shown below. For a changed multicast group which no longer satisfies the definition of the multicast burstification class it belongs to, both deletion and addition operations are required which delete the multicast group from the current multicast burstification class and add it to a new multicast burstification class.

ETON Procedures

For the addition, the procedure ETON_addition, given below, is invoked. The procedure directly accesses the list of multicast burstification classes (MBCs) that have the same number of links and edge routers in their representative multicast trees (MTs) and finds the MBC whose representative MT shares exactly the same multicast tree. If the functions are injection functions then the sequential search is done by only comparing the set values. When the correct MBC is located, the MT is added to it, otherwise, a new MBC is created and initialized with the MT. The procedure ETON_addition is listed below.

```
procedure ETON_addition(MT_i)
EdgeArray ← LinkArray[MT_i.Num_of_Links] ;
MBC_ptr ← EdgeArray[MT_i.Num_of_Edges] ;
if (MBC_ptr≠Null) /*there exists at least one MBC in
the system */
while(MBC_ptr≠ Null and
MBC_ptr.Representative_MT.LinkSet_value≠MT_i.LinkSet_value
or
    MBC_ptr.Representative_MT.Edgeset_value ≠ MT_i.EdgeSet_value
    or
    MBC_ptr.Representative_MT.CoreSet_value ≠ MT_i.Core-
    Set_value)
        oldMBC_ptr ← MBC_ptr ;
        MBC_ptr ← MBC_ptr.next ;
    end_while
    if (MBC_ptr ≠ Null)
        Insert(MBC_ptr,MT_i) ;
        Return ;
    end_if
end_if
MBC_ptr ← create(MBC) ;
MBC_ptr. Representative_MT ← MT_i ;
Add1(MBC_ptr) ;
Return;
end_procedure
```

Insert and Add1 subprocedures are given below. The Insert subprocedure inserts a multicast tree into a Multicast Burstification Class.

```
procedure Insert (MBCptr,MT)
    MT.next ← MBC_ptr.ptr_to_MT;
    MT.prev ← Null;
    if (MBC_ptr.ptr_to_MT ≠ Null) MBC_ptr.
    ptr_to_MT.prev ← MT;
    MBC_ptr.ptr_to_MT← MT_i ;
    MT_i.MBC ← MBC_ptr ;
end_procedure
```

The Add1 subprocedure adds the MBC into the lists according to the representative tree's edge router and link counts.

```
procedure Add1 (MBC_ptr)
MBC_ptr.next←Null ;
EdgeArray ← LinkArray[MBC_ptr.Representative_MT.Num_of_
Links] ;
MBC_ptr.next ←
    EdgeArray [MBC_ptr.Representative_MT.Num_of_Edges];
if (EdgeArray[MBC_ptr.Representative_MT.Num_of_Edges] ≠ Null)
    EdgeArray[MBC_ptr.Representative_MT.Num_of_Edges] .prev ←
    MBC_ptr ;
EdgeArray[MBC_ptr.Representative_MT.Num_of_Edges] ←
    MBC_ptr;
end_procedure
```

For the deletion of a MT from its MBC, the procedure ETON deletion, given below, is invoked. The procedure directly accesses the MT in the corresponding MBC's MT list and deletes the MT from the list if the MT is not the representative tree of the MBC. If the MT is the representative tree and there are some other member trees in the MBC then another member tree substitutes the representative tree due to the equivalence of the member trees and the representative tree. If there are no other member trees in the MBC, then the MBC is terminated from the system's MBC list. The procedure ETON_deletion is listed below.

```
procedure ETON_deletion(MT_i)
if (MT.MBC.Representative_MT = MT_i)
    if (MT.MBC.ptr_to_MT = Null)
        if (MT_i.MBC.prev = Null)
            if (MT_i.MBC.next = Null)
                EdgeArray[MT_i.Num_of_Edges] ← Null ;
            else
                EdgeArray[MT_i.Num_of_Edges]← MT_i.MBC.next ;
                MT_i.MBC.next.prev ← Null ;
            end_if
        else
            if (MT_i.MBC.next = Null)
                MT_i.MBC.prev.next ← Null ;
            else
                MT_i.MBC.prev.next ← MT_i.MBC.next ;
                MT_i.MBC.next.prev ← MT_i.MBC.prev ;
            end_if
        end_if
    else
        MT2 ← MT.MBC.ptr_to_MT ;
        MT.MBC.Representative_MT ← MT2 ;
        MT2.next.prev ← Null ;
        MT.MBC.ptr_to_MT ← MT2.next ;
    end_if
else
    if (MT_i.prev = Null)
        if (MT_i.next = Null)
            MT_i.MBC.ptr_to_MT ← Null)
        else
            MT_i.MBC.MT ← MT_i.next ;
            MT_i.next.prev ← Null ;
        end_if
    else
        if (MT_i.next = Null)
            MT_i.prev.next ← Null ;
        else
            MT_i.prev.next ← MT_i.next ;
            MT_i.next.prev ← MT_i.prev ;
        end_if
    end_if
end_if
end_procedure
```

If the functions are not injections then we introduce a function, called Equi-set, in order to check the equivalence of two links and/or edge sets since the function value does not uniquely specify a link and/or edge set. The function equi_set is shown below.

```
function Equi_set(A,B,n)
    for i← 1 to n
        if A.ID ≠ B.ID return(FALSE) ;
```

```
        A ← A.next ;
        B ← B.next ;
    end_for
    return (TRUE);
end_function
```

Therefore, the addition procedure needs to be changed in the case of a non-injection function as follows:

```
procedure ETON_addition2(MT_i)
EdgeArray ← LinkArray[MT_i.Num_of_Links];
MBC_ptr ← EdgeArray[MT_i.Num_of_Edges];
if (MBC_ptr≠Null) /*there exists at least a MBC in the system */
    while( MBC_ptr≠ Null and
        MBC_ptr.Representative_MT.LinkSet_value ≠
MT_i.LinkSet_value or
        MBC_ptr.Representative_MT EdgeSet_value ≠ MT_i
EdgeSet_value or
        MBC_ptr.Representative_MT CoreSet_value ≠ MT_i
CoreSet_value or
        Equi_set(MBC_ptr.Representative_MT.ptr_to_Links,
            MT_i.ptr_to_Links,MT_i.num_of_Links) or
        Equi_set(MBC_ptr.Representative_MT.ptr_to_EdgeRouter,
            MT_i.ptr_to_EdgeRouter,num_of_Edge_R))
        oldMBC_ptr ← MBC_ptr;
        MBC_ptr. ← MBC_ptr.next;
    end_while
    if (MBC_ptr ≠ Null)
        Insert(MBC_ptr,MT_i) ;
        return;
    end_if
end_if
MBC_ptr ← create(MBC);
MBC_ptr. Representative_MT ← MT_i ;
Add1(MBC_ptr) ;
return;
end_procedure
```

ECON Procedures

For the addition of a MT, the procedure ECON_addition, given below, is invoked. The procedure directly accesses the list of MBCs that have the same number of edge routers in their MTs and sequentially searches for the MBC whose MTs have exactly the same edge router coverage. If the functions are injection functions then the sequential search is done by only comparing the set values. When the correct MBC is located, the MT is added to it, otherwise, a new MBC is created and initialized with the MT. The deletion procedure is the same as ETON case.

```
procedure ECON_addition(MT_i)
MBC_ptr ← EdgeArray[MT_i.Num_of_Edges];
if (MBC_ptr≠Null) /*there exists at least a MBC in the
system */
    while(MBC_ptr≠ Null and
        MBC_ptr.Representative_MT.Edgeset_value≠MT_i
        EdgeSet_value )
        oldMBC_ptr ← MBC_ptr;
        MBC_ptr. ← MBC_ptr.next;
    end_while
    if (MBC_ptr ≠ Null)
        Insert(MBC_ptr,MT_i) ;
        return ;
    end_if
end_if
MBC_ptr ← create(MBC) ;
MBC_ptr. Representative_MT ← MT_i ;
Add1(MBC_ptr) ;
return;
end_procedure
```

For the non-injection function case, the ECON_addition2 procedure replaces the ECON_addition.

```
procedure ECON_addition2 (MT_i)
MBC_ptr ← EdgeArray[MT_i.Num_of_Edges]
if (MBC_ptr≠Null) /*there exists at least a MBC in the system */
    while( MBC_ptr≠ Null and
        MBC_ptr.Representative_MT EdgeSet_value ≠
MT_i.EdgeSet_value or
        Equi_set(MBC_ptr. Representative_MT.ptr_to_EdgeRouter,
            MT_i.ptr_to_EdgeRouter,num_of_Edge_R))
        oldMBC_ptr ← MBC_ptr;
        MBC_ptr. ← MBC_ptr.next;
    end_while
    if (MBC_ptr ≠ Null)
        Insert(MBC_ptr,MT_i) ;
        return;
    end_if
end_if
MBC_ptr ← create(MBC);
MBC_ptr. Representative_MT ← MT_i ;
Add1(MBC_ptr) ;
return;
end_procedure
```

Deletion for ECON is exactly the same as the one for ETON case.

SCON Procedures

Figure 11:
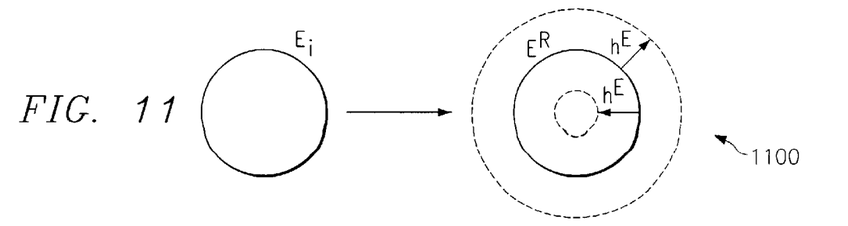
FIG. 11 shows a data structure for ECON, SCON, and OCON implementations.

For the SCON case, the addition procedure searches for a MBC within the previously mentioned threshold values. Note that while $h^E$ is the threshold for the optical edge routers, $h^E$ is discussed in terms of "distance" with respect to FIG. 11 to visualize better the concepts related to the number of optical edge routers for the SCON case. It starts the search with the MBC which has the same number of edge routers. It then continues searching in both directions alternatively for distance $h^E$ in an incremental manner as shown in FIG. 11. Therefore, it maintains shared edge routers and all links and core routers. It also keeps track of the current distance from the super tree in terms of edge router count.

```
p← 1 ;
for i← 0 to h^E
    j← 1 ;
    MBC_ptr ← EdgeArray[MT_i.Num_of_Edges+p*i] ;
    while ( j=1 or (j=2 and i < h^E-MBC_ptr.CurrentE))
        while ( MBC_ptr≠ Null and
        { p≠1 or
        !Subset (MBC_ptr.Representative_MT.ptr_to_EdgeRouters,
MT_i.ptr_to_EdgeRouters) or
            E ← (MBC_ptr. Representative_MT. Num_of_Edges –
            Cardinality(Intersectset(MBC_ptr.EdgeRouterSet,
MT_i.ptr_to_EdgeRouters)) > h^E or
            [Cardinality(Diffset(MBC_ptr.Representative_MT.ptr_to_Links,
                Unionset(MBC_ptr.LinkSet, MT_i.ptr_to_Links))) +
            Cardinality(Diffset (Unionset(MBC_ptr.LinkSet,
MT_i.ptr_to_Links),
            MBC_ptr. Representative_MT.ptr_to_Links ))] > h^L or
    [Cardinality(Diffset(MBC_ptr.
Representative_MT_i.ptr_to_CoreRouters,
```

-continued

```
       Unionset(MBC_ptr.AllCoreRouters,
MT_i.ptr_to_CoreRouters))) +
       Cardinality(Diffset(Unionset(MBC_ptr.AllCoreRouters,
MT_i.ptr_to_CoreRouters),
       MBC_ptr. Representative_MT.ptr_to_CoreRouters ))] >
h^C}
and
{ p≠-1 or
  !Subset(MT_i.ptr_to_EdgeRouters ,MBC_ptr.
Representative_MT.ptr_to_EdgeRouters) or
  E ← (MT_i. Num_of_Edges − Cardinality(MBC_ptr.EdgeRouterSet) >
h^E or
  [Cardinality(Diffset(MT_i. ptr_to_Links,
       Unionset(MBC_ptr.Linkset,
MBC_ptr.Representative_MT.ptr_to_Links))) +
   Cardinality(Diffset(Unionset(MBC_ptr.LinkSet,
MBC_ptr.Representative_MT.ptr_to_Links),
       MT_i.ptr_to_Links ))] > h^L or
   (Cardinality(Diffset(MT_i.ptr_to_CoreRouters,
Unionset(MBC_ptr.CoreRouterSet,MBC_ptr.Representative_
MT.ptr_to_CoreRouters))) +
   Cardinalty(Diffset(Unionset(MBC_ptr.CoreRouterSet,
       MBC_ptr.Representative_MT.ptr_to_CoreRouters),
MT_i.ptr_to_CoreRouters ))] > h^C
       }
oldMBC_ptr ← MBC_ptr ;
       MBC_ptr. ← MBC_ptr.next ;
end_while
if (MBC_ptr ≠ Null)
if (p=-1)
       Insert(MBC_ptr, MBC_ptr. Representative_MT) ;
       MBC_ptr. Representative_MT ← MT_i;
       MBC_ptr.LinkSet←Unionset(MBC_ptr.LinkSet,
MBC_ptr.Representative_MT_i.ptr_to_Links) ;
       MBC_ptr.CoreRouterSet←Unionset(MBC_ptr.CoreRouterSet,
MBC_ptr.Representative_MT.ptr_to_CoreRouters) ;
       Remove(MBC_ptr) ;
       Add1(MBC_ptr) ;
   else  /* p =1 */
       MBC_ptr.LinkSet←Unionset(MBC_ptr.LinksSet,
MT_i.ptr_to_Links) ;
       MBC_ptr.CoreRouterSet←Unionset(MBC_ptr.CoreRouterSet,
MT_i.ptr_to_CoreRouters) ;
       Insert(MBC_ptr, MT_i) ;
       MBC_ptr.EdgeRouterSet ←
Intersectset(MBC_ptr.EdgeRouterSet,MT_i.ptr_to_EdgeRouters ;
end_if /* if p=1) */
if (E > MBC_ptr.CurrentE )   MBC_ptr.CurrentE ← E ;
return;
end_if
p=p* (-1) ;
j←j+1;
end_while
end_for
MBC_ptr ← Create(MBC) ;
MBC_ptr.Representative_MT ← MT_i
MBC_ptr.CurrentE ← 0 ;
MBC_ptr.EdgeRouterSet ← MT_i.ptr_to_EdgeRouters ;
MBC_ptr.LinkSet ← ∅ ;
MBC_ptr. CoreRouterSet ← ∅ ;
Add1(MBC_ptr) ;
return;
end_procedure
```

The Remove procedure removes the MBC from its corresponding list.

```
procedure Remove(MBC_ptr)
   if (MT_i.MBC.prev = Null)
       if (MT_i.MBC.next = Null)
           EdgeArray[MT_i.Num_of_Edges] ← Null ;
       else
           EdgeArray[MT_i.Num_of_Edges] ← MT_i.MBC.next ;
           MT_i.MBC.next.prev ← Null ;
       end_if
   else
       if (MT_i.MBC.next = Null)
           MT_i.MBC.prev.next ← Null ;
       else
           MT_i.MBC.prev.next ← MT_i.MBC.next ;
           MT_i.MBC.next.prev ← MT_i.MBC.prev ;
       end_if
   end_if
end_procedure
```

For the deletion of a MT from its MBC, the procedure SCON_deletion, given below, is invoked. The procedure directly accesses to the MT in the corresponding MBC's MT list and deletes the MT from the list if the MT is not the representative tree of the MBC. If the MT is the representative tree then the MBC is terminated from the system's MBC list. If the MBC includes any MT, these are re-accommodated in the system by being modified individually.

```
procedure SCON_deletion(MT_i)
   if (MT_i.MBC.Representative_MT = MT_i)
       if (MT_i.MBC.ptr_to_MT ≠ Null)
           while(MT_ptr ≠ Null)
               Modify(MT_ptr) ;
               MT_ptr ← MT_ptr.next ;
           end_while
       end_if
       if (MT_i.MBC.prev = Null)
           if (MT_i.MBC.next = Null)
               EdgeArray[MT_i.Num_of_Edges] ← Null ;
           else
               EdgeArray[MT_i.Num_of_Edges] ← MT_i.MBC.next ;
               MT_i.MBC.next.prev ← Null ;
           end_if
       else
           if (MT_i.MBC.next = Null)
               MT_i.MBC.prev.next ← Null ;
           else
               MT_i.MBC.prev.next ← MT_i.MBC.next ;
               MT_i.MBC.next.prev ← MT_i.MBC.prev ;
           end_if
       end_if
   else
       if (MT_i.prev = Null)
           if (MT_i.next = Null)
               MT_i.MBC.ptr_to_MT ← Null)
           else
               MT_i.MBC.MT ← MT_i.next ;
               MT_i.next.prev ← Null ;
           end_if
       else
           if (MT_i.next = Null)
               MT_i.prev.next ← Null ;
           else
               MT_i.prev.next ← MT_i.next ;
               MT_i.next.prev ← MT_i.prev ;
           end_if
       end_if
   end_if
end_procedure
```

OCON Procedures

For OCON case, a union tree is formed by observing the threshold values. Edge array for direct access is maintained according to the size of the edge router count of the representative tree. All the processes are similar to the SCON case, however, a new representative tree called union tree needs to be formed by merging the MT into the previous representative tree. This merging is done by two approaches.

These are Breadth-First-Merge and Incremental-Merge.

```
procedure OCON_addition(MT_i)
p← 1 ;
for i← 0 to h^E
    j← 1 ;
    while ( j=1 or (j=2 and i < h^E-MBC_ptr.CurrentE))
        MBC_ptr ← EdgeArray[MT_i.Num_of_Edges+p*i] ;
        MT2 ← Breadth-First_Merge(MBC_ptr. Representative_MT, MT_i);
        while ( MBC_ptr≠ Null and
            E ← (MT2 . Num_of_Edges -
                Cardinality (Intersectset (MBC_ptr.EdgeRouterSet,
                MT_i.ptr_to_EdgeRouters)) > h^E or
                [Cardinality(Diffset(MT2.ptr_to_Links,
                    Unionset (MBC_ptr. LinkSet,
                    MT_i.ptr_to_Links))) +
                Cardinality(Diffset(Unionset(MBC_ptr.LinkSet,
            MT_i.ptr_to_Links),
                MT2.ptr_to_Links ))] > h^L or
            [Cardinality(Diffset(MT2.ptr_to_CoreRouters,
                Unionset(MBC_ptr.CoreRouterSet,
                MT_i.ptr_to_CoreRouters))) +
                Cardinality(Diffset(Unionset(MBC_ptr.CoreRouterSet,
            MT_i.ptr_to_CoreRouters),
                MT2.ptr_to_CoreRouters ))] > h^C)
            oldMBC_ptr ← MBC_ptr ;
            MBC_ptr. ← MBC_ptr.next ;
        end_while
        if (MBC_ptr ≠ Null)
            Insert(MBC_ptr, MT_i) ;
            MBC_ptr. Representative_MT ← MT2 ;
            MBC_ptr.LinkSet←Unionset(MBC_ptr.LinksSet,
        MT_i.ptr_to_Links) ;
            MBC_ptr.CoreRouterSet←Unionset(MBC_ptr.CoreRouterSet,
                MT_i.ptr_to_CoreRouters) ;
            Remove(MBC_ptr) ;
            Add1(MBC_ptr) ;
            MBC_ptr.EdgeRouterSet ←
        Intersectset(MBC_ptr.EdgeRouterSet,MT_i.ptr_to_EdgeRouters ;
        if (E > MBC_ptr.CurrentE )   MBC_ptr.CurrentE ←
        E ;
        return ;
    end_if
    p=p* (−1) ;
    j←j+1;
end_while
end_for
MBC_ptr ← Create(MBC) ;
MBC_ptr.Representative_MT ← MT_i
MBC_ptr.CurrentE ← 0 ;
MBC_ptr.EdgeRouterSet ← MT_i.ptr_to_EdgeRouters ;
MBC_ptr.LinkSet ← ∅ ;
MBC_ptr.CoreRouterSet ← ∅ ;
Add1(MBC_ptr) ;
return ;
end_procedure
```

The procedure Breadth-First-Merge assumes that both trees' adjacency lists are available. The procedure takes MT1 as the primary tree and adds the edge routers, core routers, and links of the secondary tree MT2 which are different than MT1's.

```
procedure Breadth-First-Merge (MT1,MT2)
for each v which is edge or core router adjacent to MT2
destination (root) edge router through link 1
    enqueue(Q,{v,1}) ;
while (Q≠Null)
    {v,1} dequeue(Q) ;
    if v ∉ edge or core router of MT1
        include {v,1} to MT1 ;
        for each y which is edge or core router adjacent to v
        through link k
            enqueue(Q,{y,k}) ;
end_while
end_procedure
```

Figure 12:
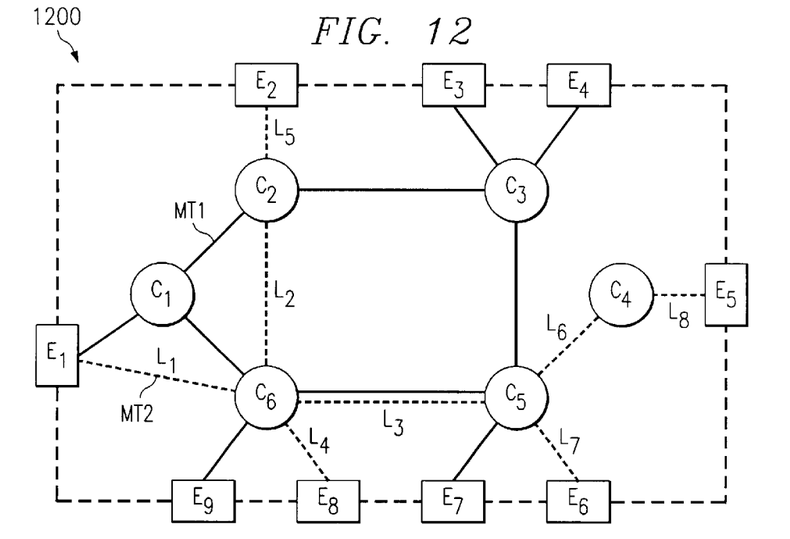
FIG. 12 shows a data structure of a multicast burstification class for ETON, ECON, SCON, and OCON.

FIG. 12 shows an example 1200 of the Breadth-first-merge procedure. There are two trees, primary tree MT1 and the secondary tree MT2, in FIG. 12. Starting from the secondary tree's root $E_1$, the procedure maintains a queue, denoted by Q, of pairs each of which has an edge/core router and the corresponding link. The procedure dequeues an item (v,l) from Q and checks if v is included in the primary tree. If it is not included then it is connected to the primary tree with the link. The adjacent edge/core routers of v are enqueued in the Q.

The step by step status of the queue is given below:

| | |
|---|---|
| $Q(v,1) \Rightarrow C_6,L_1$ | do not include $C_6,L_1$ |
| $Q(v,1) \Rightarrow C_2,L_2 ; C_5,L_3 ; E_8,L_4$ | do not include $C_2,L_2$ |
| $Q(v,1) \Rightarrow C_5,L_3 ; E_8,L_4 ; E_2,L_5$ | do not include $C_5,L_3$ |
| $Q(v,1) \Rightarrow E_8,L_4 ; E_2,L_5 ; C_4,L_6 ; E_6,L_7$ | include $E_8,L_4$ |
| $Q(v,1) \Rightarrow E_2,L_5 ; C_4,L_6 ; E_6,L_7$ | include $E_2,L_5$ |
| $Q(v,1) \Rightarrow C_4,L_6 ; E_6,L_7$ | include $C_4,L_6$ |
| $Q(v,1) \Rightarrow E_6,L_7 ; E_5,L_8$ | include $E_6,L_7$ |
| $Q(v,1) \Rightarrow E_5,L_8$ | include $E_5,L_8$ |
| $Q(v,1) \Rightarrow \emptyset$ | |

The Incremental merge takes the largest multicast tree in terms of number of members as the master tree and adds the members of the other trees to the master in an incremental manner. The upstream link of an edge or core router means the link that goes up to the root of the multicast tree from the mentioned edge or core router.

```
Procedure Incremental-Merge (MT1,MT2)
T_max←Max(MT1,MT2);
T_min←Min(MT1,MT2);
for each v which is a member edge router of T_min and not contained
by the edge routers of T_max
    1←upsteam link of v in the tree T_min;
    include(v,1) to T_max;
    v←upsteam edge or core router in the tree T_min;
    while(v ∉ edge or core router of MT1)
        1←upsteam link of v in the tree T_min;
        include(v,1) to T_max;
        v←upsteam edge or core router in the tree T_min;
    end-while
end-for
end-procedure
```

Figure 13:
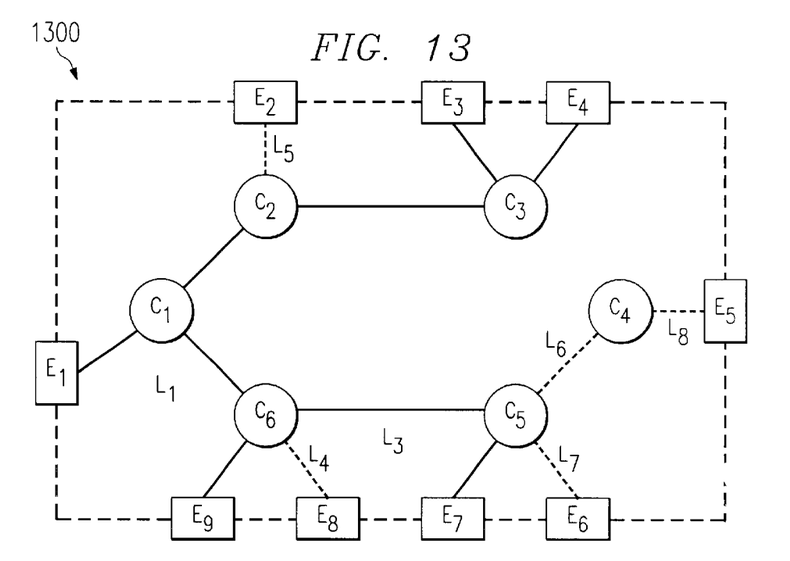
FIG. 13 shows a data structure for a multicast tree for ETON, ECON, SCON, and OCON.

The deletion algorithm works similarly to the SCON case. The removal of the representative tree results in the re-organization of all the member trees that the MBC may have. FIG. 13 shows the result 1300 of the merger of the two trees in FIG. 12 after the Breadth-First-Merge procedure has been applied to it.

An injection function can be used to determine which multicast burstification class a new multicast tree should be added to, subtracted from, or modified. Therefore, instead of having to literally compare the multicast trees, the injection function value for each multicast tree can be compared to determine whether the multicast trees are the same or not. For the injection function, f(A) where A is an ordered set and kept in an array (e.g. a[i] accommodates the ith element in the ordered set). The maximum difference between the two elements of the set in value is N. The injection function is defined as follows:

$$f(A) = \sum_{i=1}^{|A|} p_i \cdot a[i],$$

where $p_i$ is a prime number and $p_{i+1} - p_i > N$, for $i = 1, 2, \ldots, |A|$.

Any linear or nonlinear function can be used as non-injection function. For example:

$$f(A) = \sum_{i=1}^{|A|} g_i(a[i]),$$

where $g_i(a[i])$ is a function of $a[i]$ (e.g., $g_i(a[i])$ $a[i]^2$).

Although the present invention has been described in detail, it should be understood that various changes, substitutions and alterations can be made hereto without departing from the spirit and scope of the invention as described by the appended claims.

What is claimed is:

1. A method for switching multicast data packets through an optical burst switched network, comprising the steps of:
    assembling multiple multicast data packets into a multicast burst according to a multicast burstification class, wherein the multicast burstification class comprises multiple multicast trees that share one or more parameters;
    transmitting said multicast burst through said optical burst switched network; and
    disassembling said multicast burst into said multiple multicast data packets.

2. The method of claim 1, wherein said multicast burstification class comprises multiple multicast trees that share the same electronic ingress edge router, DWDM links, optical core routers, and electronic egress edge routers.

3. The method of claim 1, wherein said multicast burstification class comprises multiple multicast trees that share the same electronic ingress edge router and electronic egress edge routers.

4. The method of claim 1, wherein said multicast burstification class comprises multiple multicast trees, wherein at least one of said multiple multicast trees is a super tree that shares an electronic ingress edge router and all electronic egress edge routers included in all of said multicast trees.

5. The method of claim 4, wherein said multiple multicast trees may not share same DWDM links, optical core routers, or electronic egress edge routers.

6. The method of claim 5, wherein the difference in the number of said electronic egress edge routers, said DWDM links, or said optical core routers between said super tree and each said multicast tree is less than a predetermined threshold value.

7. The method of claim 5, wherein a classification efficiency ratio is a function of a cost of each tree within the multicast burstification class, a multicast traffic volume of each multicast group within the multicast burstification class, and the cost of a super tree of the multicast burstification class.

8. The method of claim 1, wherein the multicast burstification class includes a group of said multiple multicast data packets associated with a multicast union tree, said multicast union tree covering all electronic egress edge routers covered by all said multiple multicast trees.

9. The method of claim 8, wherein said multiple multi cast trees may not share all of the same DWDM links, optical core routers, or electronic egress edge routers.

10. The method of claim 9, wherein the difference in the number of said electronic egress edge routers, said DWDM links, or said optical core routers between said union tree and each said multicast tree is less than a predetermined threshold value.

11. The method of claim 1, further comprising adding a new multicast tree to one of said plurality of multicast burstification classes comprising:
    searching for one of said plurality of existing multicast burstification classes; and
    determining if said new multicast tree satisfies the definition of said existing multicast burstification class; and
    if said new multicast tree satisfies the definition of said existing multicast burstification class, adding said new multicast tree to said existing multicast burstification class; and
    else creating a new multicast burstification class and add said new multicast tree to said new multicast burstification class.

12. The method of claim 1, further comprising deleting a multicast tree from one of said plurality of multicast burstification classes comprising:
    finding said existing multicast burstification class containing said multicast tree which needs to be deleted;
    deleting said multicast tree from said existing multicast burstification class; and
    removing said existing multicast burstification class if said existing multicast burstification class is empty after deleing said multicast tree.

13. The method of claim 1, further comprising modifying an existing multicast burstification class due to the changing of an existing multicast tree within said plurality of multicast burstification classes comprising:
    searching for said existing multicast tree that has been changed so it no longer satisfies the definition of said existing multicast burstification class;
    deleting said multicast tree from said existing multicast burstification class;
    searching for a new existing multicast burstification class to which to add said changed multicast tree;
    adding said changed multicast tree to said new existing multicast burstification class;
    creating a new multicast burstification class if no new existing multicast burstification class is found to which to add said changed multicast tree; and
    adding said changed multicast tree to said newly created multicast burstification class.

14. The method of claim 1, wherein said multicast burstification class is ETON, said ETON having a data structure comprising:
    a LinkArray, an EdgeArray, an MBC List comprising a plurality of MBCs, and an MT List comprising a plurality of MTs, wherein said LinkArray is an array of pointers to a corresponding EdgeArray for any MBCs having the same number of links in their trees, and further wherein said MBC list includes a list of MTs that belong to said MBC list.

15. The method of claim 1, wherein said multicast burstification class is ECON, SCON, and OCON, said ECON, SCON, and OCON having a data structure comprising:
    an EdgeArray, an MBC list comprising a plurality of MBCs, and an MT list, wherein said EdgeArray points to any MBCs having the same number of edge routers in their representative trees.

16. The method of claim 1, wherein a data structure for each multicast burstification class comprises:
a pointer, and
a linked list of all MTs that belong to said MBC.

17. The method of claim 1, wherein a data structure for the multicast burstification class comprises:
a set of pointers, a list of edge routers, a core router, a set of links, a LinkSet value, an EdgeSet value; and a CoreSet value, wherein said pointers point to lists of said edge routers, core routers and links which it utilizes, further wherein said LinkSet, Edgeset and CoreSet values operate to narrow a search for an MT.

18. A system for switching multiple multicast data packets through an optical burst switched network, comprising:
an electronic ingress edge router operable to assemble said multiple multicast data packets into a multicast burst according to a multicast burstification class and transmit said multicast burst to said optical burst switched network, wherein said multicast burstification class comprises multiple multicast trees; and
an electronic egress edge router operable to receive said multicast burst from said optical burst switched network and disassemble said multicast burst into said multiple multicast data packets.

19. The system of claim 18, wherein said multicast burstification class comprises multiple multicast trees sharing the same electronic ingress edge router, DWDM links, optical core routers, and electronic egress edge routers.

20. The system of claim 18, wherein said multicast burstification class comprises multiple multicast trees sharing the same electronic ingress edge router and electronic egress edge routers.

21. The system of claim 18, wherein said multicast burstification class comprises multiple multicast trees, wherein at least one of said multiple multicast trees is a super tree that covers all of said electronic ingress edge router and said electronic egress edge routers shared by all of said multicast trees combined.

22. The system of claim 21, wherein said multiple multicast trees may not share DWDM links, optical core routers, or said electronic egress edge routers.

23. The system of claim 22, wherein the difference in the number of said electronic egress edge routers, said DWDM links, and said optical core routers between said super tree and each said multicast tree is less than a predetermined threshold value.

24. The system of claim 18, wherein said multicast burstification class comprises a multicast union tree, said multicast union tree covering all of said electronic egress edge routers that are covered by all said multiple multicast trees combined.

25. The system of claim 24, wherein said multiple multicast trees may not share DWDM links, optical core routers, or said electronic egress edge routers.

26. The system of claim 25, wherein the difference in the number of said electronic egress edge routers, said DWDM links, and said optical core routers between said union tree and each said multicast tree is less than a predetermined threshold value.

27. A method of merging a new multicast tree into an existing multicast tree forming a union tree, comprising the steps of:
maintaining a queue of edge/core router and corresponding link pairs;
releasing an item comprising an edge/core router and link pair from the queue;
checking if the edge or core router from said released item is included in said existing multicast tree;
connecting said edge or core router to said existing multicast tree with its corresponding link if said edge or core router from said item is not included in said existing multicast tree; and
adding adjacent edge/core routers of said edge or core router to said queue.

28. The method of claim 27, wherein said queue of edge/core router and corresponding link pairs begins at said new multicast tree's root edge router.

29. A method of merging a new multicast tree into an existing multicast tree forming a union tree, comprising the steps of:
finding the largest existing multicast tree based on the number of edge/core routers and their corresponding links; and
adding new edge/core routers and their corresponding links to said existing multicast tree in an incremental manner.

30. The method of claim 7, wherein classification efficiency ratio is no less than one.

31. A method for switching multicast data packets through a burst switched network, comprising the steps of:
receiving a plurality of multicast data packets that are associated with two or more different multicast trees;
assembling a single multicast burst with one set of overhead from multicast data packets that are associated with two or more of the different multicast trees that share one or more parameters; and
transmitting said multicast burst through said burst switched network.

32. The method for switching multicast data packets of claim 31, wherein said two or more of the different multicast trees that share one or more parameters comprises multicast trees that share the same ingress edge router and egress edge routers.

33. The method for switching multicast data packets of claim 31, wherein said two or more of the different multicast trees that share one or more parameters comprises at least one super tree that shares all ingress edge routers and all egress edge routers in all of said two or more multicast trees.

34. The method for switching multicast data packets of claim 31, wherein said step of transmitting said multicast burst through said burst switched network, comprises the steps of:
selecting one of the two or more of the different multicast trees to transmit the single multicast burst in response to a load balancing technique; and
transmitting said multicast burst in accordance with the selected multicast tree.

* * * * *